United States Patent
Oikonomou et al.

(10) Patent No.: US 7,567,511 B1
(45) Date of Patent: Jul. 28, 2009

(54) METHOD AND APPARATUS FOR COMPUTING THE COST OF PROVIDING VPN SERVICE

(75) Inventors: Kostas Oikonomou, Colts Neck, NJ (US); Rakesh K. Sinha, Edison, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 525 days.

(21) Appl. No.: 11/431,305

(22) Filed: May 10, 2006

(51) Int. Cl.
*H04L 12/56* (2006.01)
(52) U.S. Cl. ..................................... 370/230
(58) Field of Classification Search ............ 370/395.21, 370/230
See application file for complete search history.

(56) References Cited

U.S. PATENT DOCUMENTS

| | | | |
|---|---|---|---|
| 5,423,002 A | 6/1995 | Hart | |
| 5,583,862 A | 12/1996 | Callon | |
| 5,841,758 A * | 11/1998 | Chen et al. | 370/238 |
| 5,930,257 A | 7/1999 | Smith et al. | |
| 5,963,556 A | 10/1999 | Varghese et al. | |
| 5,999,536 A | 12/1999 | Kawafuji et al. | |
| 6,069,889 A | 5/2000 | Feldman et al. | |
| 6,079,020 A | 6/2000 | Liu | |
| 6,339,595 B1 | 1/2002 | Rekhter et al. | |
| 6,374,303 B1 | 4/2002 | Armitage et al. | |
| 7,039,687 B1 | 5/2006 | Jamieson et al. | |
| 7,263,069 B2 * | 8/2007 | Yegenoglu | 370/254 |
| 2002/0174246 A1 * | 11/2002 | Tanay et al. | 709/238 |
| 2004/0168088 A1 * | 8/2004 | Guo et al. | 713/201 |
| 2005/0265255 A1 * | 12/2005 | Kodialam et al. | 370/252 |

OTHER PUBLICATIONS

Sven Erlander and Neil F. Stewart, "The Gravity Model in Transportation Analysis", 1990, VSP, pp. 72-77.*
Sven Erlander, et al., "The Gravity Model in Transporation Analysis", pp. 72-77, 1990 VSP BV, The Netherlands.

* cited by examiner

*Primary Examiner*—Derrick W Ferris
*Assistant Examiner*—Peter Cheng

(57) ABSTRACT

A method and apparatus is disclosed wherein a cost of bandwidth usage in a virtual private network is calculated as a function of a plurality of traffic matrices associated with said bandwidth. In a first embodiment, the cost is calculated as a function of the maximum number of channels required to support an upper bound of the bandwidth of all connections originating from at least one node in the network. In accordance with another embodiment, the cost of providing service is calculated as a function of a traffic matrix in said plurality of traffic matrices, said traffic matrix requiring the highest possible bandwidth use of all traffic matrices in said plurality of traffic matrices. Finally, in accordance with a third embodiment, said cost is calculated as a function of the most-likely amount of bandwidth used by a customer.

1 Claim, 3 Drawing Sheets

| MATRIX | NY-CHICAGO | CHICAGO-DALLAS | DALLAS-NY |
|---|---|---|---|
| 301 — $T_1$ | 48 | 0 | 0 |
| 302 — $T_2$ | 36 | 12 | 12 |
| 303 — $T_3$ | 45 | 3 | 3 |

| | MATRIX | NY-CHICAGO | CHICAGO-DALLAS | DALLAS-NY |
|---|---|---|---|---|
| 301 | $T_1$ | 48 | 0 | 0 |
| 302 | $T_2$ | 36 | 12 | 12 |
| 303 | $T_3$ | 45 | 3 | 3 |

US 7,567,511 B1

METHOD AND APPARATUS FOR COMPUTING THE COST OF PROVIDING VPN SERVICE

BACKGROUND OF THE INVENTION

The present invention relates generally to virtual private networks and, more particularly, to calculating the cost of providing service over circuit-based virtual private networks.

Determining the cost of the operation of a communications network is an important aspect of determining the appropriate amount to charge customers for services provided over the network. In digital telephony networks where the network is implemented at the physical layer, for example, the operating cost of the network is relatively easy to determine. Specifically, the total cost of operating such a network can generally be calculated as the sum of the cost of the hardware (e.g., switches, routers, or multiplexers) and the cost of providing bandwidth for the links between nodes in the network. More particularly, the cost of the hardware in such a calculation is a combination of the depreciated value of the hardware purchase price and the hardware maintenance charges. The cost attributed to the links depends on whether the network operator leases or owns the transmission lines, such as trunk lines. If the network operator leases the lines, for example, the cost of the links is the sum of the monthly lease rate for the lines. If the network operator owns the lines, the cost of the link is the depreciated purchase price of the lines.

While determining the cost of a network having dedicated physical resources is relatively simple, calculating the cost of other networks is not as easy. For example, Virtual Private Networks (VPNs) have grown in popularity as a method of providing relatively secure communication between the nodes in a network. As is well-known to one skilled in the art, a virtual private network does not typically have dedicated network hardware but, instead, is a secure virtual network created across a public network, such as the Internet, by establishing one or more defined private links using, for example, encryption and tunneling techniques. As such, a VPN shares resources, such as the equipment facilities of a public network, with other virtual private networks as well as other non-VPN traffic. As is well known, VPNs maintain privacy by encapsulating messages in packets or frame relay frames to separate the messages from those of other VPNs that share the same public network. Encryption and tunneling function to ensure the privacy of messages transmitted across a VPN. Therefore, such networks are very advantageous in many regards. However, due to the foregoing sharing of the network resources, calculating the cost attributed to service provided to each user is difficult.

SUMMARY OF THE INVENTION

The present invention substantially solves the foregoing problems. In accordance with the principles of the present invention, a cost of bandwidth usage in a virtual private network is calculated as a function of a plurality of traffic matrices associated with said bandwidth. In a first embodiment, the cost is calculated as a function of the maximum number of channels required to support all traffic matrices in said plurality of traffic matrices. In accordance with another embodiment, the cost of providing service is calculated as a function of a traffic matrix in said plurality of traffic matrices, said traffic matrix requiring the highest possible bandwidth use of all traffic matrices in said plurality of traffic matrices. Finally, in accordance with a third embodiment, said cost is calculated as a function of the most-likely amount of bandwidth used by a customer.

DETAILED DESCRIPTION OF THE INVENTION

Figure 1:
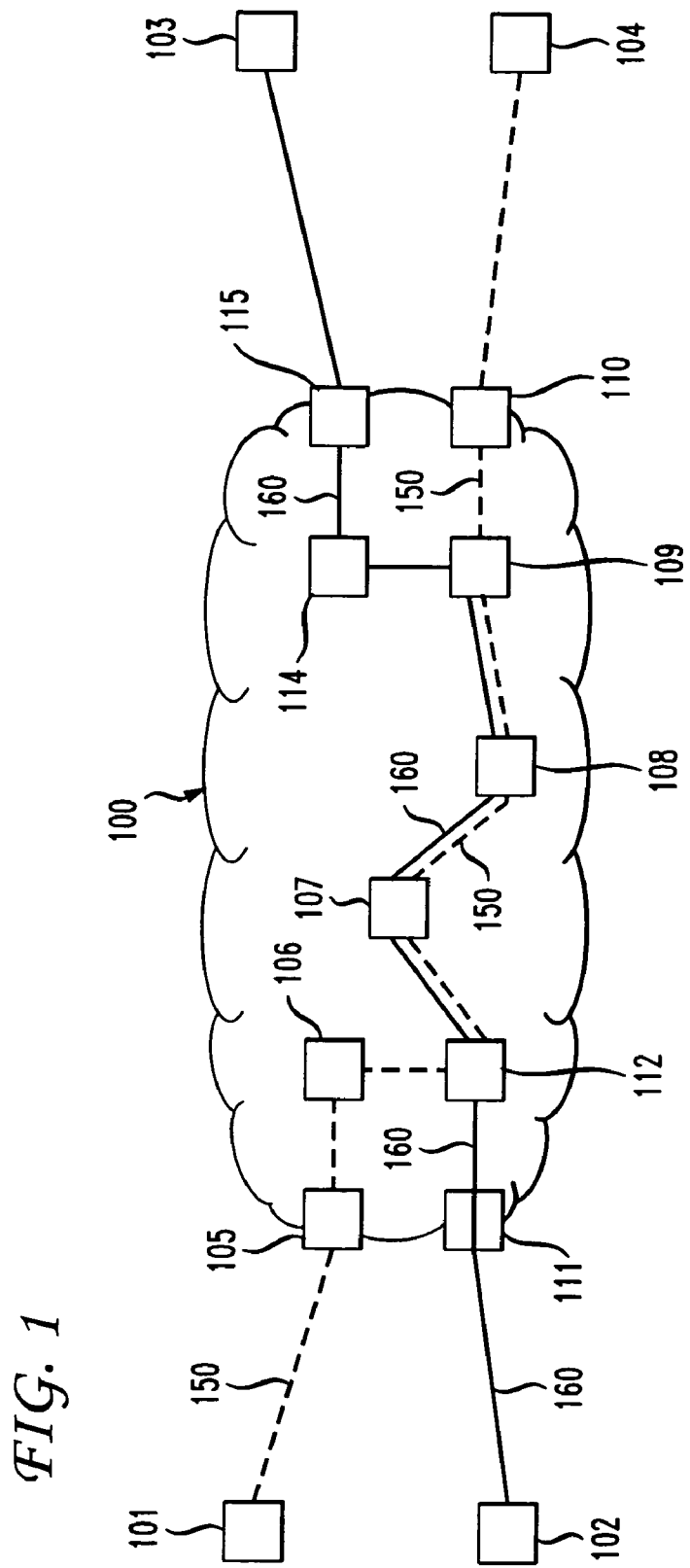
FIG. 1 shows a prior art Virtual Private Network.

FIG. 1. shows an illustrative network in which a Virtual Private Network may be implemented. Specifically, FIG. 1 shows an illustrative network provided by an Internet Service Provider (ISP). In that figure, network 100 has illustrative cross connects (XCs) that interconnect, for example, OC-48 and OC-192 links. As is well-known, these links are communication links capable of carrying approximately 2.5 and 10 GB/s of bandwidth respectively. One skilled in the art will understand that any suitable links with varying amounts of bandwidth may be used equally advantageously. The cross connects 105-115 interconnecting these links may be, for example, IP routers or, alternatively, digital cross connects. Referring to FIG. 1, two traffic flows are shown corresponding to two different customers or users of the network 100, each having a VPN between a source node 101 or 102 and destination nodes 104 and 103, respectively. In the first VPN traffic flows, for example, from source node 101 along links 150 through nodes 105, 106, 112, 107, 108, 109 and 110 before reaching destination node 104. In the second VPN, traffic flows from source node 102 along links 160 through nodes 111, 112, 107, 108, 109, 114 and 115 before reaching destination node 103. As can be seen in the network 100 of FIG. 1, traffic originating from both nodes 101 and 102 does not have a dedicated physical network. Instead, nodes 112, 107, 108 and 109 and links to/from those nodes each carry traffic from both nodes 101 and 102. Other VPN or non-VPN traffic may simultaneously be carried across these nodes. Periodically, a customer may provision or delete connections, or paths, between these nodes, thus creating circuits that vary the shared nodes/links over time.

As discussed above, defined paths are created in VPNs using well-known techniques across the network to provide dedicated bandwidth and path control for the customer. One such technique, known as Multi-Protocol Label Switching (MPLS), is frequently used in VPNs to route data from a source to a destination. As is well-known, MPLS enables the creation of "virtual circuits", or tunnels, across an Internet Protocol (IP) network. These virtual circuits make it possible to use MPLS to provision VPN services such as, for example, the aforementioned traffic engineering services. Using MPLS for a VPN isolates the traffic from different users, much like the isolation provided by physical ATM or frame relay networks. One illustrative method for applying MPLS to provision a VPN on an IP network is described in Internet Engineering Task Force (IETF) Request for Comment (RFC) 2546, which can be found at the World Wide Web address http://www.ietf.org/rfc/rfc2547.txt.

Figures 2, 3:
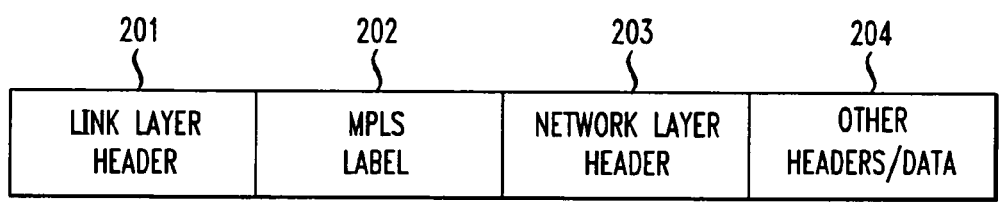
FIG. 2 shows a prior art packet using MPLS.
FIG. 3 shows illustrative traffic matrices satisfying service constraints in a VPN network.

As is also well known, an MPLS network routes, for example, data packets along a label switch path to a destination from one node to another using conventional routers and well-known Local Area Network (LAN) techniques. In such an MPLS network, each incoming packet includes a label that has an appearance similar to a packet header. FIG. 2 shows an illustrative example of such a header at the link layer of the network having, for example, a link layer header 201, an MPLS label field 202, a network layer header 203 and other layer headers/data fields 204. One skilled in the art will recognize that this arrangement is illustrative in nature and other arrangements may be used equally advantageously.

As packets traverse the label switch path, each node along that path makes a forwarding decision for the packet based solely on the contents of the label field 202. As each node forwards a packet, the network strips the existing label from the message and adds a new label that provides forwarding instructions for the next node on the label switch path. MPLS, therefore, enables the creation of virtual circuits, or tunnels, across an Internet Protocol (IP) network. These virtual circuits make it possible to use MPLS to provision VPN services such as traffic engineering. Using MPLS for a VPN provides traffic isolation, much like an Asynchronous Transfer Mode (ATM) or frame relay service.

As one skilled in the art will recognize, the cost of any particular communication across these virtual circuits in the network depends on the paths taken by the communication. VPN customer typically contract for VPN service within the limits specified by a committed access rate (CAR). A committed access rate is a parameter used by a service provider to rate-limit traffic based on certain matching criteria, such as incoming interface, IP precedence, QoS group, or IP access list criteria. A CAR facilitates the configuration of the network through functions such as transmit, drop, precedence definition, or QoS group identification when traffic conforms to or exceeds the rate limit. In this way, a service provider can tailor the amount of bandwidth and QoS a customer receives according to the contract.

The provider of the VPN on a public network must price the service for each customer in order to meet the competitive conditions of the market place and to recover the provider's investment in the infrastructure of the network. However, it is difficult to establish a price for the bandwidth that each VPN customer uses when the destination of the traffic may not be known. In order to address the needs of multiple customers and to ensure there is adequate bandwidth for all customers, the service agreement with each customer sets forth constraints on service. Typically, there are two types of constraints imposed in such service agreements:

1. For each cross connect there is an upper bound on the total bandwidth of all incoming connections, and a corresponding bound for all outgoing connections; and
2. Between certain pairs of XCs there is an upper bound on the size of the connection between those cross connects.

For example, a service contract between the customer and the service provider may specify that the total bandwidth of all connections from New York to Chicago is 48 Synchronous Transport System level 1 (STS-1) streams, and from Dallas it is 24 STS-1 streams. As one skilled in the art will recognize STS-1 is the basic unit of bandwidth from which synchronous optical network (SONET) circuits are formed and has a typical bit rate of 51.840 Mbps. Assume further that another constraint is that, at any time, there can be at most 12 STS-1 streams between Dallas and New York or between Dallas and Chicago and, in addition, there can be at most 48 STS-1 streams between Chicago and New York.

FIG. 3 shows three traffic matrices 301-303 representing parameters for traffic between New York, Chicago and Dallas that satisfy the foregoing constraints. As used herein, a traffic matrix is defined as the specification of the amount of traffic, in some units, between different nodes in a network. One skilled in the art will recognize that, with the constraints discussed above in mind, a number of traffic matrices can be developed. Referring to FIG. 3, in traffic matrix $T_1$ 301, bandwidth equal to 48 STS-1 streams is available from New York to Chicago and no bandwidth is available from Chicago to Dallas or from Dallas to New York. In traffic matrix $T_2$ 302, there is a total bandwidth of 36 STS-1 streams from New York to Chicago and a total bandwidth of 12 STS-1 streams from Chicago to Dallas and from Dallas to New York. Finally, in traffic matrix $T_3$ 303, there is a total bandwidth of 45 STS-1 streams from New York to Chicago and a total bandwidth of 3 STS-1 streams from Chicago to Dallas and from Dallas to New York. As one skilled in the art will recognize, each of the matrices of FIG. 3 satisfy all of the foregoing constraints.

Thus, as can be seen in FIG. 3, there are multiple traffic matrices that satisfy a given service agreement between a customer and a service provider. Any of these matrices and others will result in a different cost of providing service to the customer, making it difficult to anticipate the amount to bill each customer. As discussed above, since multiple VPN customers and non-VPN customers use the network simultaneously, each having different service agreements that can be satisfied by multiple traffic matrices, calculating the cost of service to each of these customers is challenging.

In accordance with the principles of the present invention, the cost of transmitting data across a network is determined as a function of the possible traffic matrices. Specifically, in a first embodiment, a service provider may estimate the cost of a customer's usage by calculating, for each link in the network, the maximum number of channels needed to support all traffic matrices. As one skilled in the art will recognize, this approach is similar to the approach whereby no other services are present in the network. This method is advantageous in that the cost can be solved independently for each edge/link in the network. Specifically, the maximum capacity needed on that edge/link is equal to the largest cumulative flow that can be sent between two nodes while satisfying the specific service constraint.

In mathematical terms, let $N_e$ be the set of node pairs communicating via edge e and let $d_{ij}$ represent variables of a linear program representing the size of the connection from i to j, $(i,j) \in N_e$. Thus, in accordance with the principles of the present invention, maximizing $\Sigma_{i,j} d_{ij}$ while making sure that $d_{ij}$ satisfy all the service constraints will permit a cost estimate based on all traffic matrices of a customer. For example, if $u_i$ is the upper bound of all connections originating at node i, a constraint is imposed whereby $\Sigma_j d_{ij} \leq u_i$ (i.e., all service constraints are linear).

One skilled in the art will recognize that, since this calculation is performed independently of all other customers, that any cost derived as a result of the foregoing method may result in a large overestimate of the actual services provided to a customer. This is because, according to the foregoing cost estimation method, capacity that potentially or actually is used by another customer may be incorporated into the estimate. In particular, since all of a customer's possible traffic matrices are used to calculate the cost to that customer, the cost will typically include bandwidth identified in traffic matrices that were not in use by that customer.

Therefore, in accordance with another embodiment, a cost is computed for each traffic matrix and, then, that traffic matrix with the highest bandwidth use is attributed to a specific customer. As such, when costs are calculated this way for each customer, it will reflect the cost during a worst-case network load condition at any given time (i.e., the cost will be based on each customer's maximum possible bandwidth usage). Once let $d_{ij}$ is the size of the connection/the demand from node i to node j and $c_{ij}$ is the sum of the costs per unit capacity on each edge of the connection's path. Accordingly, the cost of the connection is $d_{ij}c_{ij}$. As one skilled in the art will recognize, the worst-case traffic matrix for each customer can be calculated via a linear program by maximizing $\Sigma_{i,j}d_{ij}$ subject to the aforementioned service constraints.

However, once again, this method may result in an overestimate of the bandwidth used by each customer since most customers will not be utilizing the traffic matrix with the greatest bandwidth usage at all time. As a result, in a third embodiment, an algorithm for determining a most-likely traffic matrix cost is used. This algorithm attempts to determine the most-likely amount of bandwidth used by each customer. According to this algorithm, it is illustratively assumed that a fixed amount of N units of total traffic is experienced in the network and that there are no constraints on the flow of traffic. As a result, all traffic matrices with N total demand are possible. Accordingly, if there are m nodes in the network, then an m×m traffic matrix having M=m² elements in the matrix can be constructed showing all possible traffic flows through the network. Accordingly, since it is assumed there are no constraints imposed, the N units of traffic, can be distributed various ways between the M nodes. For example, with 10 units of traffic and 3 elements in the matrix (i.e., traffic between three pairs of nodes), there are $$\binom{10}{3,5,2} = \frac{10!}{3!5!2!} = 2520$$

possible distributions so that 3 of the units of traffic are between the first pair of nodes, 5 are between the second pair of nodes, and 2 are between the third pair of nodes. However, assuming that the distribution is impartial (i.e., there are no constraints), the most likely distribution of traffic will be that there are 3 units between the first pair, three between the second pair and 4 between the third pair of nodes. This is the most likely scenario because this outcome can be realized in the greatest number of ways, i.e., $$\frac{10!}{3!3!4!} = 4200$$

different ways. Thus, a most likely traffic matrix can be defined with the set of $m^2$ numbers corresponding to the variables $d_{ij}$, i=1, ..., m, j=1, ..., m that maximizes the multimodal coefficient expressed by:

$$\binom{N}{d_{11}, \ldots, d_{1m}, d_{21}, \ldots, d_{2m}, \ldots, d_{m1}, \ldots, d_{mm}}. \quad \text{Equation 1}$$

where, as discussed above, N is the total amount of traffic in the network and the variables $d_{ij}$ are variables of a linear program representing the size of the connection from i to j, (i, j)∈$N_e$.

As discussed above, the foregoing assumes that there is a fixed amount of N units of total traffic in the network. However, one skilled in the art will recognize in light of the foregoing that it is possible to account for a variable amount of traffic by replacing N with $\Sigma_{i,j}d_{ij}$ in Equation 1. Similarly, the foregoing assumed that there were no constraints to the distribution of service. However, constrained distribution can be addressed by adding in the service constraints discussed herein above. As a result, the problem thus becomes maximizing the function expressed by:

$$\frac{\left(\sum_{i,j} d_{ij}\right)!}{\left(\prod_{i,j} d_{ij}\right)!} \quad \text{Equation 2}$$

subject to any specified constraints on $d_{ij}$.

Equation 2 advantageously attempts to maximize the total traffic over the network. One skilled in the art will recognize, however, that if m and the allowable variables $d_{ij}$ are large, determining the solution to Equation 2 becomes relatively difficult. Therefore it is desirable to simplify the calculation. One skilled in the art will thus recognize that Stirling's approximation may be used for this purpose. As is well known, Stirling's approximation gives an approximate value for the factorial function n! for n>>1. The approximation can most simply be derived for an integer by approximating the sum over the terms of the factorial with an integral, so that:

$$\ln n! = \ln 1 + \ln 2 + \ldots + \ln n = \sum_{k=1}^{n} \ln k \approx \int_{1}^{n} \ln x \, dx \quad \text{Equation 3}$$
$$= [x\ln x - x]_1^n = n\ln n - n + 1 \approx n\ln n - n$$

Thus, applied to Equation 2, by treating the variables as continuous, the problem of Equation 2 may be transformed to a maximization of an entropy-like function G of a network bandwidth demand matrix D:

$$\max_D G(D) = \left(\sum_{i,j} d_{ij}\right)\ln\left(\sum_{i,j} d_{ij}\right) - \sum_{i,j} d_{ij}\ln d_{ij} \quad \text{Equation 4}$$
$$\text{subject to} \sum_j d_{ij} \leq u_i,$$

One skilled in the art will recognize that the function G(·) is concave, so Equation 4 consists of maximizing a concave function over a convex domain. Therefore, Equation 4 will have a solution with a unique answer of a most-likely traffic matrix $\hat{D}$. One skilled in the art will also recognize that, when the total traffic in the network is large, the vast majority of traffic matrices D satisfying the specified constraints will have entropy very close to $\hat{D}$. Thus, according to the foregoing description, the cost of service for a user in a circuit-based VPN can be calculated.

Figure 4:
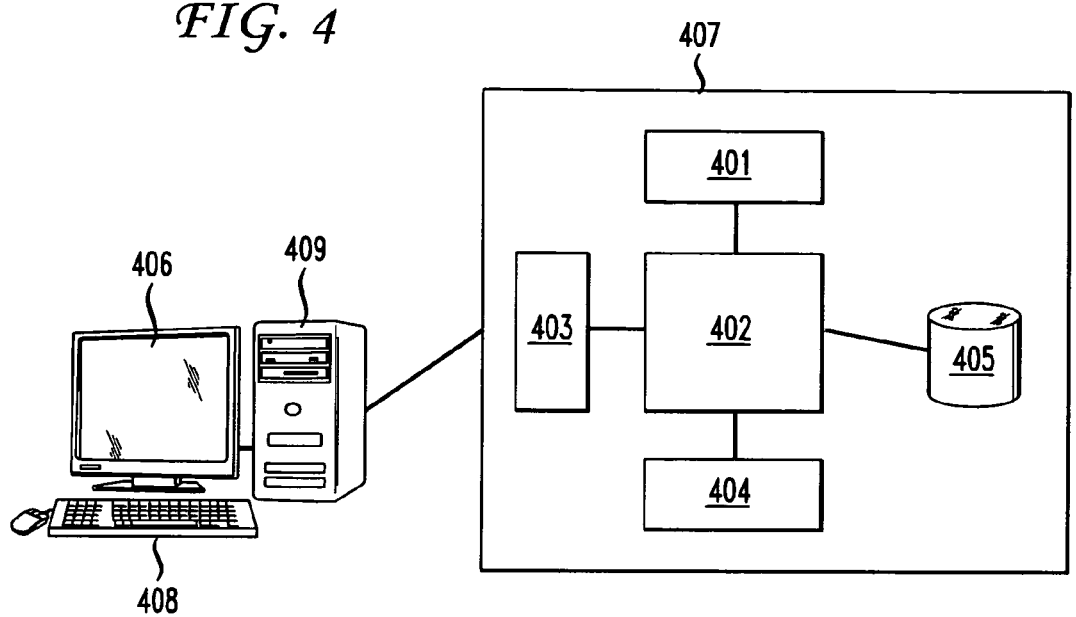
FIG. 4 shows a block diagram of a computer useful in implementing a network in accordance with the principles of the present invention.

FIG. 4 shows a block diagram of an illustrative cost calculation system that is adapted to perform the steps of the algorithm for calculating costs in a VPN as described herein above. Referring to FIG. 4, cost calculation system 407 may be implemented on any suitable computer adapted to receive, store and transmit data such as the aforementioned algorithm calculations. Illustrative system 407 may have, for example, a processor 402 (or multiple processors) which controls the overall operation of the system 407. Such operation is defined by computer program instructions stored in a memory 403 and executed by processor 402. The memory 403 may be any type of computer readable medium, including without limitation electronic, magnetic, or optical media. Further, while one memory unit 403 is shown in FIG. 4, it is to be understood that memory unit 403 could comprise multiple memory units, with such memory units comprising any type of memory. System 407 also comprises illustrative network interface 404 for use in, among other functions, collecting bandwidth usage and traffic matrix information. System 407 also illustratively comprises a storage medium, such as a computer hard disk drive 405 for storing, for example, data and computer programs adapted for use in accordance with the principles of the present invention as described hereinabove. One skilled in the art will recognize that flash memory may preferably be used in some implementations in place of hard disk drive 405. Finally, system 407 may also have illustrative terminal 406 having, illustratively, keyboard 408 and monitor 409 for inputting information and displaying results of the foregoing calculations. One skilled in the art will recognize that system 407 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. Apparatus for determining a cost of providing a virtual private network service, said apparatus comprising:

means for identifying a plurality of traffic matrices, said traffic matrices representing constraints on traffic flows in said virtual private network service; and means for calculating said cost as a function of said plurality of traffic matrices, wherein said means for calculating said cost calculates said cost as a function of:

the most-likely amount of bandwidth used by a customer;

maximizing the expression:

$$\frac{\left(\sum_{i,j} d_{ij}\right)!}{\left(\prod_{i,j} d_{ij}\right)!}$$

where $d_{ij}$ represents the size of the connection between nodes i and j; and calculates said cost as a function G of a network bandwidth demand matrix D:

$$\max_D G(D) = \left(\sum_{i,j} d_{ij}\right) \ln\left(\sum_{i,j} d_{ij}\right) - \sum_{i,j} d_{ij} \ln d_{ij}$$

$$\text{subject to} \sum_j d_{ij} \leq u_i,$$

where $d_{ij}$ represents the size of the connection between nodes i and j.

* * * * *